United States Patent
Chefalas et al.

(10) Patent No.: US 10,394,323 B2
(45) Date of Patent: Aug. 27, 2019

(54) TEMPLATES ASSOCIATED WITH CONTENT ITEMS BASED ON COGNITIVE STATES

(71) Applicant: INTERNATIONAL BUSINESS MACHINES CORPORATION, Armonk, NY (US)

(72) Inventors: Thomas E. Chefalas, Somers, NY (US); James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 14/958,960

(22) Filed: Dec. 4, 2015

(65) Prior Publication Data

US 2017/0160891 A1    Jun. 8, 2017

(51) Int. Cl.
   *G06F 3/048*    (2013.01)
   *G06F 3/01*     (2006.01)
   (Continued)

(52) U.S. Cl.
   CPC ........... *G06F 3/015* (2013.01); *G06F 3/048* (2013.01); *G06F 8/38* (2013.01); *G06F 9/4451* (2013.01);
   (Continued)

(58) Field of Classification Search
   CPC .... G06F 3/00484; G06F 3/015; G06F 17/248; G06F 16/40; G06F 16/74; G06F 3/048
   See application file for complete search history.

(56) References Cited

U.S. PATENT DOCUMENTS

| 6,016,146 A * | 1/2000 | Beer ............. G06F 9/451 715/825 |
| 6,721,706 B1 * | 4/2004 | Strubbe ............. G10L 15/18 704/257 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Linh K Pham
(74) *Attorney, Agent, or Firm* — Law Office of Jim Boice (57) ABSTRACT

A processor-implemented method, system, and/or computer program product alter a template used to display content on a user interface. One or more processors receive a transmission from the one or more hardware devices that describes a current cognitive state of a user. The processor(s) receive content to be presented to the user on a user interface, and identify template components that are appropriate for presenting the content to the user based on the current cognitive state of the user. The processor(s) alter an initial template used to present the content, such that altering the initial template creates an altered template, and where the altered template uses the template components that are determined to be appropriate for presenting the content to the user based on the current cognitive state of the user. The processor(s) then present the content on the user interface using the altered template.

19 Claims, 9 Drawing Sheets

(51) Int. Cl.
  *G06F 17/24*   (2006.01)
  *G06F 8/38*    (2018.01)
  *G06F 9/445*   (2018.01)
  *G06F 9/451*   (2018.01)

(52) U.S. Cl.
  CPC ............ *G06F 9/451* (2018.02); *G06F 17/248* (2013.01); *G06F 2203/011* (2013.01)

(56) References Cited

U.S. PATENT DOCUMENTS

| | | | | |
|---|---|---|---|---|
| 6,999,955 | B1* | 2/2006 | Horvitz | G06N 7/005 706/45 |
| 7,076,737 | B2 | 7/2006 | Abbott et al. | |
| 9,542,693 | B2* | 1/2017 | Brooks | |
| 2002/0138331 | A1 | 9/2002 | Hosea et al. | |
| 2002/0146676 | A1* | 10/2002 | Reynolds | G09B 5/00 434/362 |
| 2003/0046401 | A1 | 3/2003 | Abbott et al. | |
| 2006/0115802 | A1* | 6/2006 | Reynolds | G09B 5/00 434/236 |
| 2006/0253783 | A1* | 11/2006 | Vronay | G06F 17/248 715/730 |
| 2006/0277467 | A1* | 12/2006 | Reponen | G06F 3/011 715/708 |
| 2007/0022389 | A1* | 1/2007 | Ording | G06F 3/0481 715/790 |
| 2008/0027743 | A1* | 1/2008 | Gerrie | G06Q 99/00 705/500 |
| 2008/0101660 | A1* | 5/2008 | Seo | H04N 21/44218 382/118 |
| 2009/0082692 | A1* | 3/2009 | Hale | A61B 5/0476 600/544 |
| 2009/0158179 | A1* | 6/2009 | Brooks | G06Q 10/00 715/762 |
| 2009/0265611 | A1 | 10/2009 | Sengamedu et al. | |
| 2010/0036665 | A1* | 2/2010 | Bess | G06F 8/38 704/251 |
| 2010/0220250 | A1* | 9/2010 | Vanderwall | G01C 11/02 348/837 |
| 2011/0291863 | A1* | 12/2011 | Ozaki | G01C 21/3682 340/995.14 |
| 2012/0069131 | A1* | 3/2012 | Abelow | G06Q 10/067 348/14.01 |
| 2012/0136219 | A1* | 5/2012 | Huang | G06N 5/02 600/300 |
| 2012/0254733 | A1 | 10/2012 | Tuconic | |
| 2012/0324353 | A1* | 12/2012 | Torbey | G06F 3/048 715/716 |
| 2013/0009761 | A1* | 1/2013 | Horseman | B60W 40/08 340/425.5 |
| 2013/0031470 | A1 | 1/2013 | Daly et al. | |
| 2013/0144709 | A1* | 6/2013 | Narasimhan | G06Q 30/02 705/14.41 |
| 2013/0152000 | A1* | 6/2013 | Liu | G06F 9/44 715/765 |
| 2013/0185066 | A1* | 7/2013 | Tzirkel-Hancock | G10L 15/20 704/233 |
| 2013/0266924 | A1* | 10/2013 | Zelin | G09B 7/00 434/362 |
| 2014/0179287 | A1 | 6/2014 | Liang | |
| 2014/0317199 | A1* | 10/2014 | Lucero | H04L 51/00 709/206 |
| 2014/0317522 | A1* | 10/2014 | Lucero | G06F 3/01 715/744 |
| 2015/0051451 | A1* | 2/2015 | Kido | G06F 19/28 600/301 |
| 2015/0053066 | A1* | 2/2015 | Hampiholi | B60W 50/14 84/602 |
| 2015/0143209 | A1* | 5/2015 | Sudai | G06F 17/248 715/202 |
| 2015/0160019 | A1* | 6/2015 | Biswal | G01C 21/26 701/1 |
| 2015/0242391 | A1* | 8/2015 | Goel | G06F 17/2785 704/9 |
| 2015/0242457 | A1 | 8/2015 | Collier et al. | |
| 2015/0264431 | A1* | 9/2015 | Cheng | H04N 21/44218 725/10 |
| 2015/0367770 | A1* | 12/2015 | Newton-Dunn | B60Q 1/00 340/438 |
| 2016/0035234 | A1* | 2/2016 | Choi | G09B 5/02 434/323 |
| 2016/0071509 | A1* | 3/2016 | Zhao | G10L 13/04 704/260 |
| 2016/0203726 | A1* | 7/2016 | Hibbs | G09B 7/02 434/308 |
| 2017/0316707 | A1* | 11/2017 | Lawrenson | G09B 5/04 |

OTHER PUBLICATIONS

Adrienne Lafrance, "Computers Can Predict Schizophrenia Based on How a Person Talks". The Atlantic, Aug. 26, 2015. <http://www.theatlantic.com/technology/archive/2015/08/speech-analysis-schizophrenia-algorithm/402265/>.

Olga Khazan, "This App Reads Your Emotions on Your Face". The Atlantic, Jan. 15, 2014. <http://www.theatlantic.com/technology/archive/2014/01/this-app-reads-your-emotions-on-your-face/282993/>.

* cited by examiner

TEMPLATES ASSOCIATED WITH CONTENT ITEMS BASED ON COGNITIVE STATES

BACKGROUND

The present disclosure relates to the field of computer systems, and specifically to the field of computer systems that display content on graphical user interfaces. Still more specifically, the present disclosure relates to creating and/or selecting templates to display content based on a cognitive state of a user.

SUMMARY

A processor-implemented method, system, and/or computer program product alter a template used to display content on a user interface. One or more processors receive a transmission from the one or more hardware devices that describes a current cognitive state of a user. The processor(s) receive content to be presented to the user on a user interface, and identify template components that are appropriate for presenting the content to the user based on the current cognitive state of the user. The processor(s) alter an initial template used to present the content, such that altering the initial template creates an altered template, and where the altered template uses the template components that are determined to be appropriate for presenting the content to the user based on the current cognitive state of the user. The processor(s) then present the content on the user interface using the altered template.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
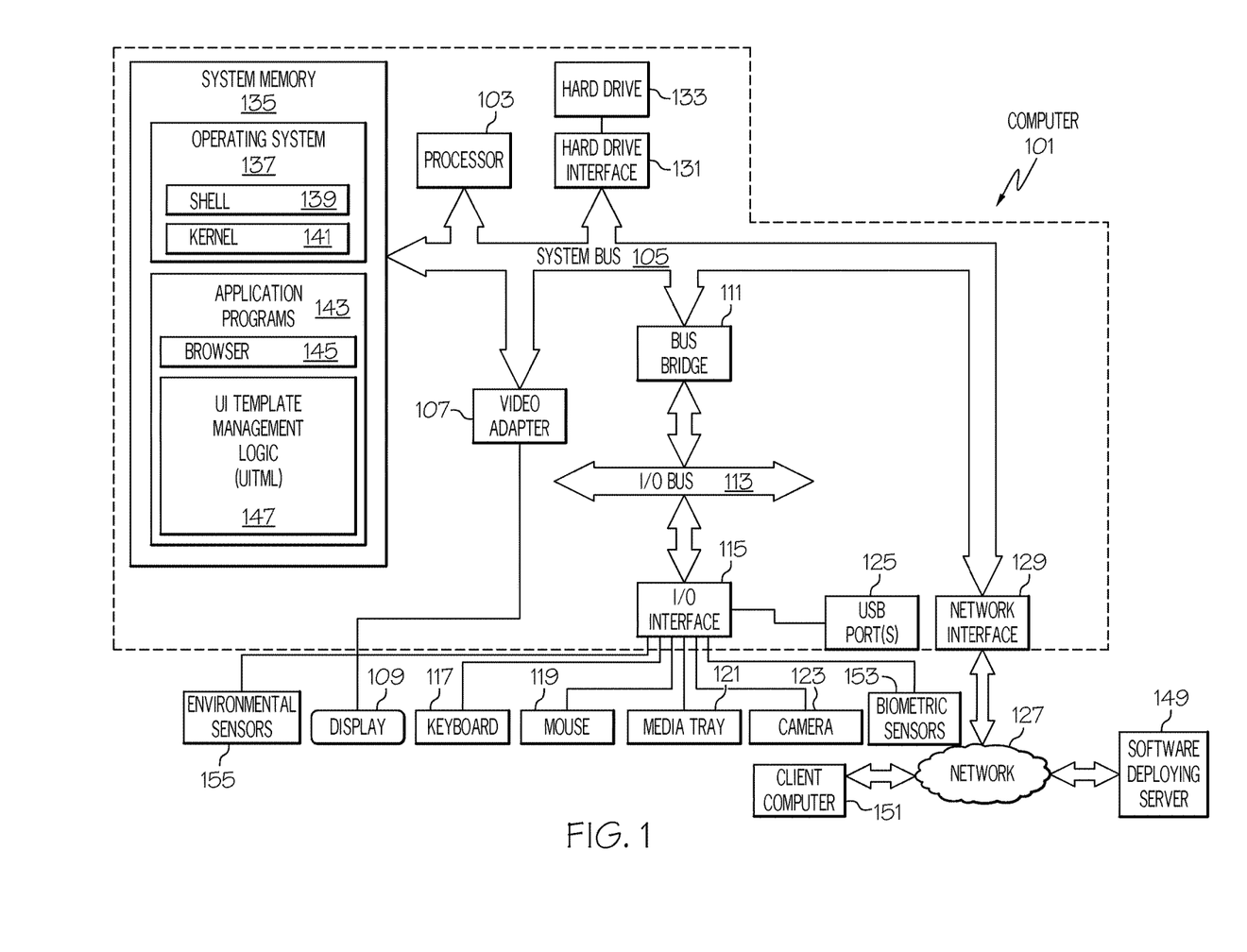
FIG. 1 depicts an exemplary system and network in which the present disclosure may be implemented.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 101 may be utilized by software deploying server 149 and/or client computer 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 118, a media tray 121 (which may include storage devices such as CD-ROM drives, multi-media interfaces, etc.), a camera 123 (capable of capturing still and/or video images), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or client computer 151 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 133, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include an User Interface Template Management Logic (UITML) 147. UITML 147 includes code for implementing the processes described below, including those described in FIGS. 2-6. In one embodiment, computer 101 is able to download UITML 147 from software deploying server 149, including in an on-demand basis, wherein the code in UITML 147 is not downloaded until needed for execution. Note further that, in one embodiment of the present invention, software deploying server 149 performs all of the functions associated with the present invention (including execution of UITML 147), thus freeing computer 101 from having to use its own internal computing resources to execute UITML 147.

Computer 101 (and particularly client computer 151) includes one or more biometric sensors 153, which are able to detect body heat, pupil size, respiration, skin sweat, etc. used to determine the current physiological and/or psychological state of a user. For example, if a person is sweating and has constricted pupils, then a state of anxiety in the user may be assumed.

Computer 101 (and particularly client computer 151) also includes environmental sensors 155, such as microphones, light sensors, vibration sensors, etc. that detect a current environment state (e.g., noise, light, darkness, motion, earthquakes, etc.) of computer 101 (and particularly client computer 151).

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Described herein is a method and system of creating or selecting a template for display of content, such that the representation adapts to a real-time assessment of the cognitive state of the user. In one or more embodiments, the system learns what templates, or template alterations, are best for different cohorts of users.

In the prior art, content is associated with templates without any regard to the real-time cognitive state of the viewer. The present invention, however, associates templates with content items based on the current mood and current cognitive state of the person or persons, and optionally along with a consideration of the content and the screen size to display the content item.

The term template can have many meanings. For example, it may concern the control of Web page formatting and eBook formatting, where items are arranged on a page and how they respond to user interface (UI) interactions. Templates can also control the layout of items on other kinds of UIs, such as interactive UIs that allow a user to enter data, request information, etc.

Applications, eBooks, and/or web resources (e.g., websites) that seek to display dynamic content face the challenge of displaying the dynamic content in a visually appealing way in combination with editorially chosen content. The challenge appears when arranging content within templates where the templates may be designed for editorially chosen content, but dynamic content, coming from outside sources, may not fit the rigid templates when it is desirable to improve the template based on a user's cognitive state. Thus, layouts of the content may be arranged in an odd or ineffective manner (or may not be useful for classes of viewers) and not be responsive to a cognitive state of a user (including fatigue level, distraction level, medical conditions, etc.).

As mentioned above, in the prior art content is often arranged into rigid templates that are pre-made and not chosen based on content or a real-time assessment of a user state. Rather, content is made to fit the template. This results in little variability in displays and no consideration of automated assessment of user mood, cognitive state, fatigue level, distraction level, membership in a particular cohort, etc.

In an embodiment of the present invention, template composition utilizes "template" snippets that are composed in real time, based on a user's real-time context. Additionally, a module includes a learning component that refines templates over time.

Applications may request and/or receive content items from a database, which may be any online repository storing content items, and a content cluster may be created based on application requirements and on real-time cognitive considerations. Application requirements may be, for instance, that the content cluster is a boxed content cluster (i.e., content items are presented with boxed borders), unboxed content cluster (i.e., there are no boxes around content items), and the like. The content cluster may also be arranged based on available screen space. Content items may be associated with templates within the content cluster until there are no more content items to display or a maximum column count has been reached. The maximum column count may depend on the available screen space.

Templates may be selected for content items based on automated assessment of user mood, cognitive state, fatigue level, distraction level, cohort membership, etc., along with the presence of an image, size of an image, content image aspect ratio, title length, content length, abstract presence, snippet presence, template class, and the like. Once all content items have been associated with a template, the set of content items is displayed within the content cluster.

At a high level, the present invention presents a method and system of creating or selecting a template for display of content, with the representation changing based on the cognitive state of user. The cognitive state is any of nervousness, elation, fatigue, frustration, anger, distraction level, etc.

The cognitive state may be related to a user type/cohort (e.g., certain medical and/or psychological states). Certain psychological states may be estimated by an analysis of how words are strung together by a user. That is, certain patterns of words and how they are strung together may indicate a certain medical/psychological state of the user.

In one or more embodiments of the present invention, the cognitive state is inferred (with a certain level of confidence) by any of: user biometric, facial expression analysis, noise level in the environment, possible distractions caused by number of open activities (e.g., windows open) on a computer desktop, concurrent use of other devices (e.g., a phone), possible fatigue based on meeting schedules for the day (as determined by entries on an electronic calendar for the user), etc.

The cognitive state may also inferred by any of: user profile, caregiver input, demographic factors, etc.

In one or more embodiments of the present invention, the template change may involve graphics and layouts, scenes meant to soothe the user, cartoons designed to amuse the user, etc. That is, the template change may involve changes to textual attributes, such as words meant to sooth the user. The template change may involve changes to audio attributes, such as a change to or addition of music, sounds of nature, a user's favorite song, etc. The template change may involve the building of an object in a virtual world. The template change may involve the inclusion or specification of a puzzle, joke, or riddle. The template change may involve the size of the graphical elements.

Templates may be higher dimensional constructions in which the higher dimension relates to such considerations as progression of a cognitive disease, progression of an emotional state, etc.

The system may learn what templates are best for different cohorts of users.

The present invention affords the utility of selecting and changing templates based on cognitive considerations, including changing the template based on cognitive state of user. Depending on the class of user a person is in, a person may want a different template that is more useful to me based on my current state or cohort (e.g., medical or psychological cohort) and cognitive style, etc. Thus, User A may need to use a UI that utilizes a standard template, while User B, who has a medical/psychological condition that makes using the standard template difficult if not impossible, is better off with a template/UI that uses a different spacing, arrangement, sizing, etc. than that of the standard template.

The system learns what templates are best for different cohorts (classes of user) so that other users in the same class/cohort can benefit as the system learns. For example, a user may tap on a certain style of template when the user "likes" it. In other embodiments, the system may determine (with a certain level of confidence) that a user is becoming impatient, nervous, etc.

Figure 2:
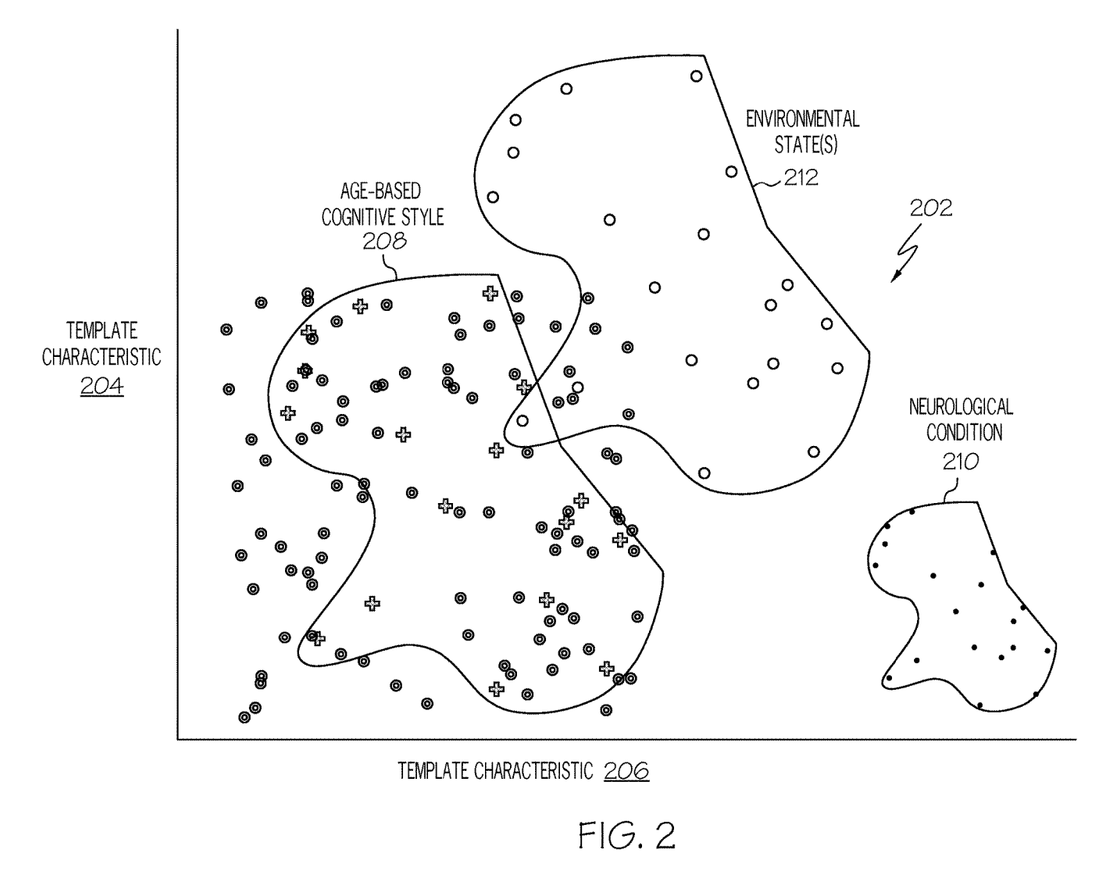
FIG. 2 illustrates a graph with various clusters that are best suited to particular types of template characteristics.

With reference now FIG. 2, a graph 202 depicts various clusters that are best suited to particular types of template characteristics. Plotted on graph 202 are two template characteristics. For example, template characteristic 204 may be the use of text on a template/UI (with the quantity of text usage increasing along the vertical axis for template characteristic 204). Template characteristic 206 may be the use of complex pie graphs on a template/UI (with the quantity of complex pie graphs used on a single UI increasing from left to right along the horizontal axis for template characteristic 206).

For example, assume that cohort 208 is made up of young persons. As such, history has shown that members of cohort 208 best interact with a template/UI that is has little text (as indicated by cohort 208 being in the lower part of graph 202) and few pie charts (as indicated by cohort 208 being in the left area of graph 202).

Assume now that cohort 210 is for persons having a certain neurological condition. Historical data shows that persons in cohort 210 would rather use little text but is high in pie charts.

Assume further that cohort 212 is for users who are in one or more particular environmental states, such as being in a loud area that is moderately bright. As such, members of cohort 212 (i.e., users who are in these environments) prefer a template/UI that is heavy in text (as indicated by being in the upper area of graph 202) and a moderate quantity of pie charts (as indicated by being in the middle (from left to right) area of the graph 202.

Figure 3:
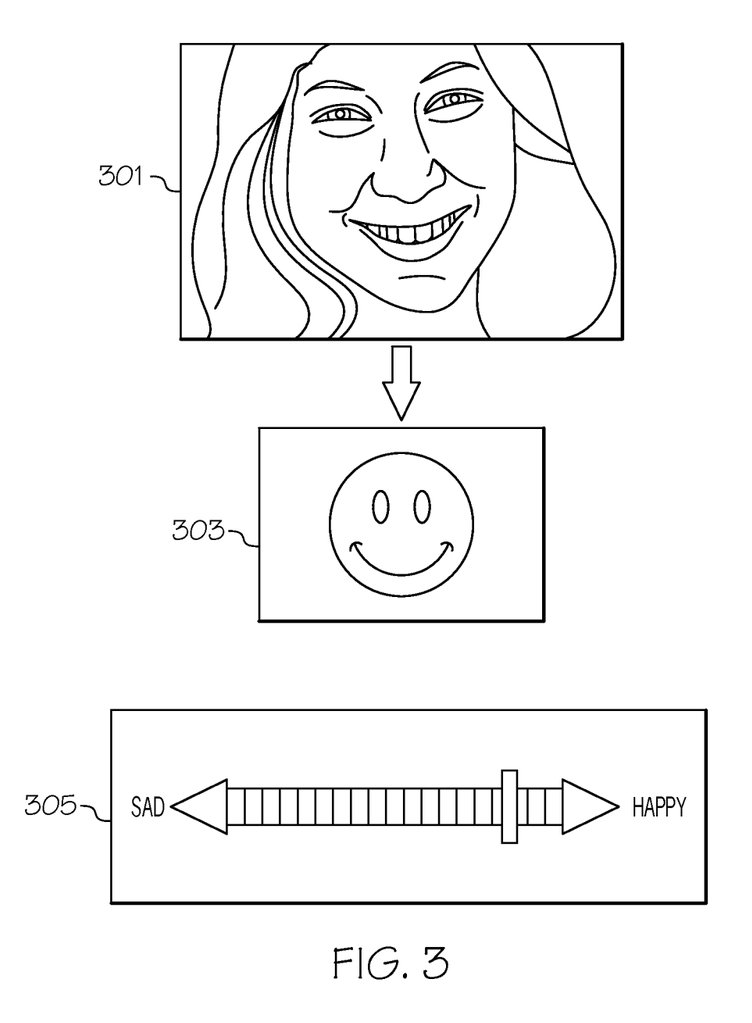
FIG. 3 depicts an app that converts a photographic image of a user into a cognitive state emoji and/or graph.

Various approaches are possible for estimating a user's cognitive state. For example, an application ("app") for a computer or smart phone may use face-tracking technology that allows computers to read facial expressions. As shown in FIG. 3, a system (e.g., client computer 151 shown in FIG. 1) takes a digital photograph 301 (e.g., using camera 123 shown in FIG. 1) of the user. The UITML 147 (e.g., within the computer 101 shown in FIG. 1) recognizes certain shapes of the photographed face in the digital photograph 301, and converts those shapes into an emoji 303 and/or a line graph 305 representing a state of happiness for the user of the system.

Figure 4:
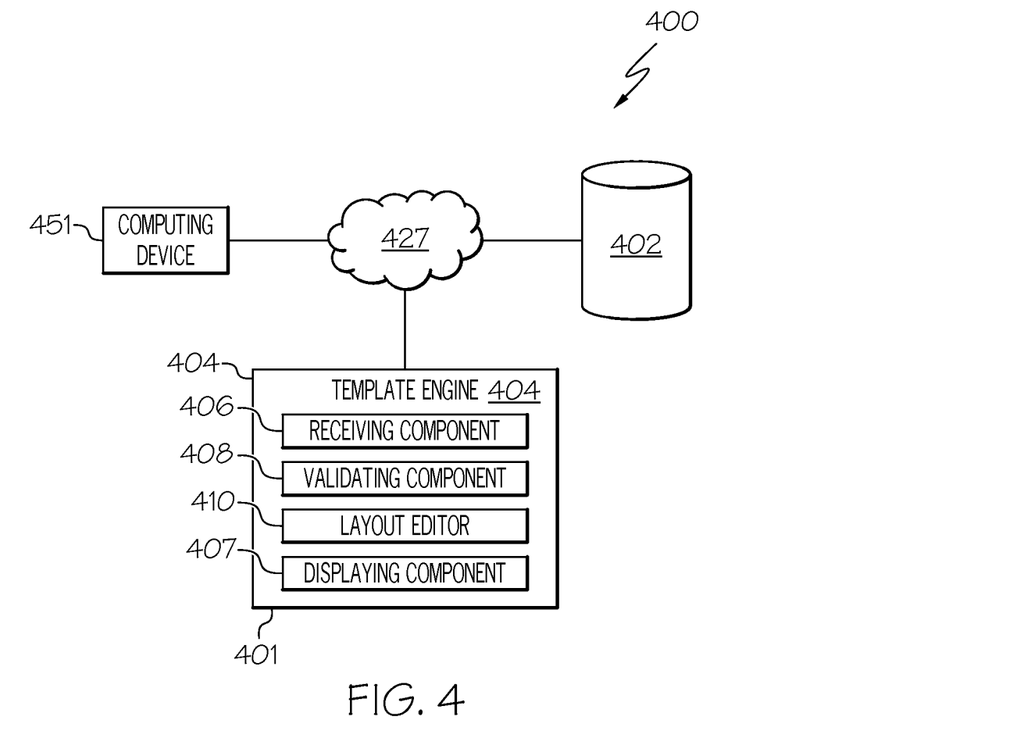
FIG. 4 illustrates an exemplary system used in one or more embodiments of the present invention.

With reference now to FIG. 4, an exemplary system 400 used in one or more embodiments of the present invention is presented. System 400 dynamically assigns content items to templates based on current real-time cognitive states of the user.

System 400 includes a computing device 451 (analogous to client computer 151 shown in FIG. 1), which communicates via a network 427 with a database 402 and a computer 401 (analogous to computer 101 shown in FIG. 1), which determines what types of layouts are used on the client computing device 451. Database 402 may be any database that stores content items (i.e., layout items), and is accessible by entities submitting proposed content items to be used on a template/UI.

The template engine 404 is part of any device (such as computer 401) that is capable of implementing the present invention. The receiving component 406 is configured to receive content items (such as newspaper stories and photos). The validating component 408 validates a template class, if any, associated with a content item. A template class refers generally to an identifier representing an indication of specific properties of a content item. Template classes may be based on whether an image is present, the size of the image, the orientation of the image, whether the content item is a video or slide show, etc. The template classes may also be used to control the layout origination of content.

The layout editor 410 is configured to associate content items with templates based in part on the cognitive state of a current viewer. The layout editor 410 may evaluate a variety of factors including a user's cognitive state, a template class, screen size, etc.

The displaying component 407 is a driver/interface (e.g., video adapter 107 shown in FIG. 1) for displaying the dynamically adjusted template on the UI.

Figure 5:
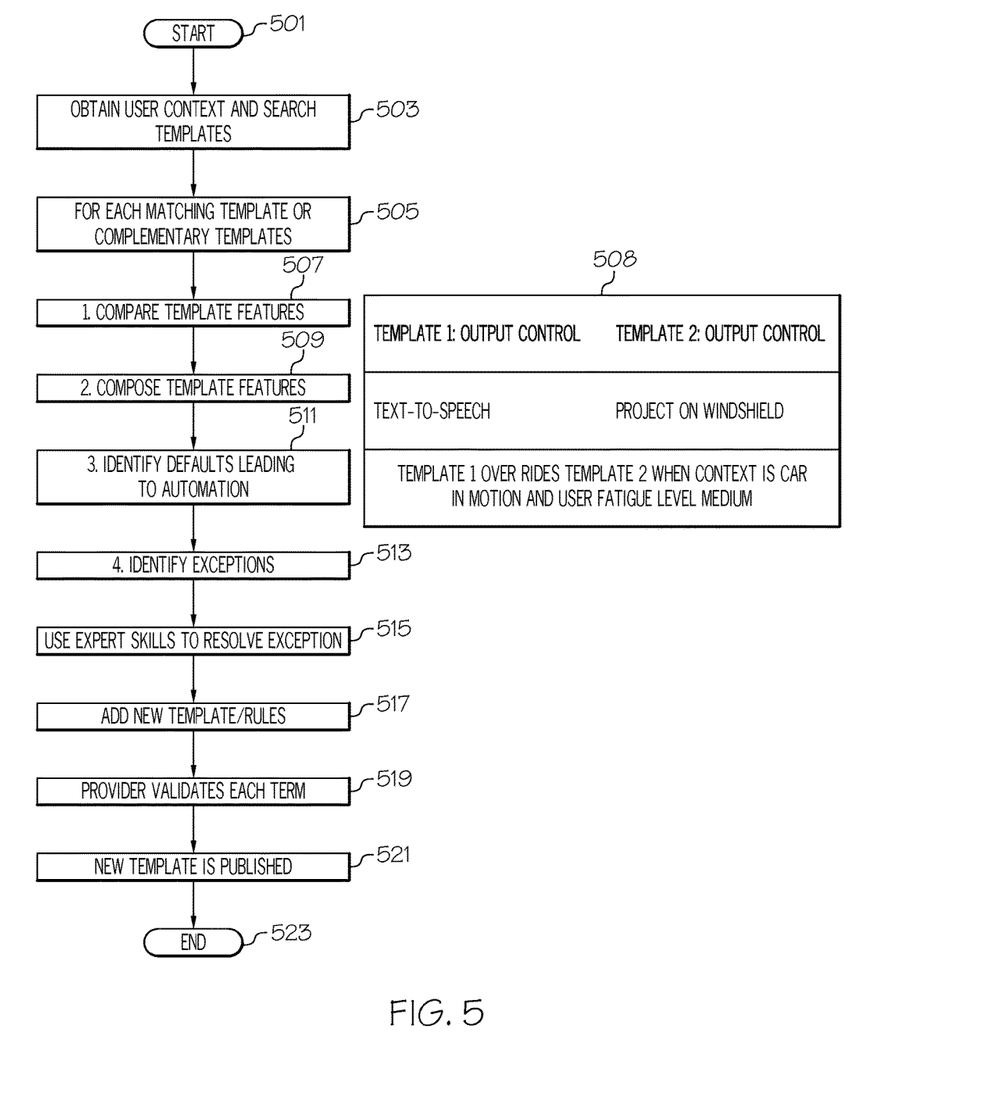
FIG. 5 is a detailed flow chart of one or more steps performed by one or more processors and/or other hardware devices to generate and/or select user interface template in accordance with one or more embodiments of the present invention.

With reference now to FIG. 5, a detailed flow chart of one or more steps performed by one or more processors and/or other hardware devices to generate and/or select a UI template in accordance with one or more embodiments of the present invention is presented.

After initiator block 501, the system obtains user context and searches for candidate templates, as described in block 503. That is, the system identifies the context of the user, including the user's current emotional state (as determined by photo analysis, readings from biometric sensors on the user, etc.), the user's general state (e.g., level of maturity, physical and psychological state, etc.), the environment (e.g., a noisy environment, a bright environment, etc.), etc. The system then determines which initial template is best suited for displaying content (e.g., from a webpage, an eBook, a data collection/survey page, a product ordering page, etc.).

As shown in block 505, the system performs several steps for each template or complementary template that matches the user context.

As shown in block 507, the system compares template features. For example, as shown in table 508, one template ("Template 1") may output content verbally but performing a text-to-speech conversion. This type of output is useful if the content is appropriate for verbal communication, and if the user is in a state (e.g., quiet environment, is not hearing impaired, etc.) in which he/she can hear the content. Another template ("Template 2") may display text and/or other visual content on a heads-up display (e.g., on a windshield of a car). As shown in table 508, if the vehicle is in motion and/or the driver is tired, then displaying text information on a heads-up display is inappropriate and/or dangerous, such that the text-to-speech template will override the text projection template, even if the user's other cognitive features favor the heads-up display.

As described in block 509, the system then composes certain template features that best match the current cognitive and environment of the user. For example, if a user is a toddler who is known to interact best with cartoons and clickable icons, then these features are retrieved and/or created by the system to be used for that user.

As described in block 511, the system then identifies any default settings (e.g., cartoons and clickable buttons for toddlers). However, in block 513, any exceptions to these default settings (e.g., a toddler having limited hand/eye coordination) are identified. As shown in block 515, an expert system (e.g., a heuristic capability of UITML 147 shown in FIG. 1) resolve the exception (e.g., use an aural template instead of a cartoon/clickable button template). These new template features are then added to the template (block 517), and each new feature/term is validated (block 519) as being appropriate for the user (e.g., based on how well the user interacts with this new template). Once the system confirms that this new template is useful, it is published for use by other systems (block 521). The flow chart ends at terminator block 523.

As described herein, the present invention customizes a template for a particular real-time cognitive state and environment of a particular user. The generated/selected specific templates are targeted to persons with certain cognitive abilities. These templates may be selected based on the determination of cognitive state, and then adjusted over time as certain states progress.

For example, assume that two cognitive states are considered. The first cognitive state is a normal cognitive state, and the second cognitive state is an impaired cognitive state. Thus, when the template asks for the user's date of birth, the original template (to be used with a person having a normal cognitive state) asks the user to "Enter MM-DD-YY". However, the cognitively impaired template (for the user with a cognitive impairment) will display or say to the user "I see you were born in the month of January. Please enter the day of your birth in that month.". Or the cognitively impaired template may say "I see you were born on January 1. What year were you born in?" Similarly, for an address entry, the original template may state "Enter your Street Address", which the cognitively impaired template may state "What's the name of your street?" or "I see you live on Main Street. What is the number on Main Street where you live?"

If the UI is directed to obtaining a food order from a person, an original template may ask the user to "Please choose an entree from the list below" (where a listing of menu items is displayed below). However, a cognitively impaired template may ask "Do you want to eat breakfast, lunch, or supper?". If the user enters "supper", then the cognitively impaired template would as follow-up questions "Do you want to eat beef, chicken, or fish?" and then "Do you want to have a red sauce or a white sauce?".

Figure 6:
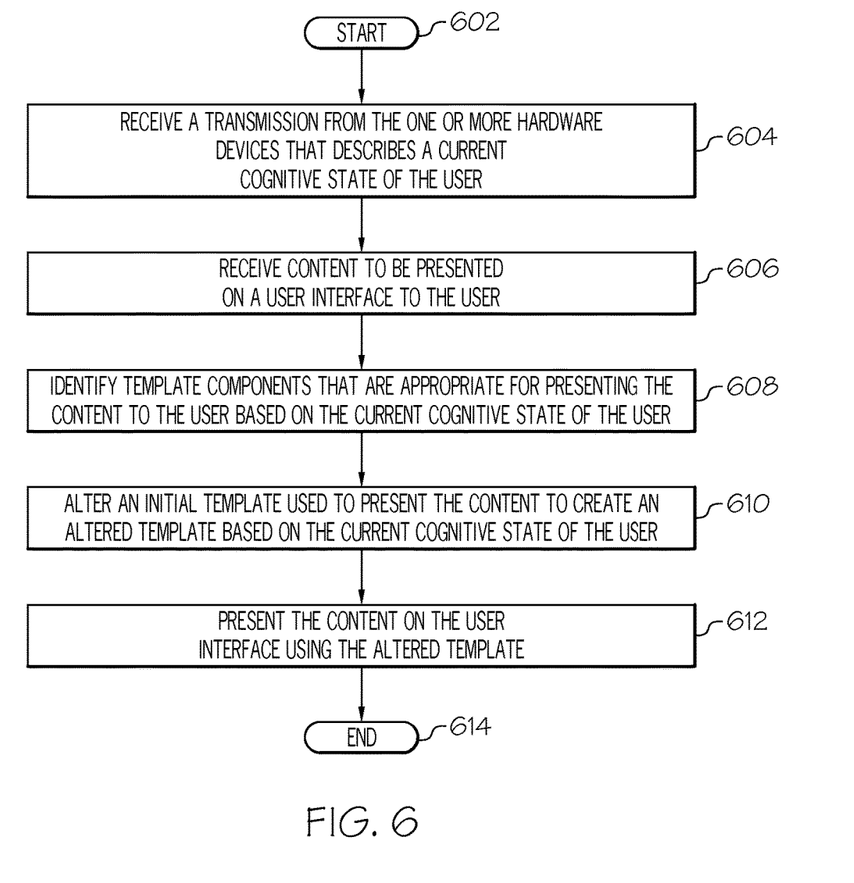
FIG. 6 is a high level flow chart of one or more steps performed by one or more processors and/or other hardware devices to generate and/or select a user interface template in accordance with one or more embodiments of the present invention.

With reference now to FIG. 6, a high level flow chart of one or more steps performed by one or more processors and/or other hardware devices to generate and/or select a UI template in accordance with one or more embodiments of the present invention is presented.

After initiator block 602, one or more processors receive a transmission from the one or more hardware devices that describes a current cognitive state of a user (e.g., camera 123 shown in FIG. 1, as described in block 604.

As described in block 606, the processor(s) receive content to be presented on a user interface to the user (e.g., a webpage, an eBook, a questionnaire, etc.).

As described in block 608, the processor(s) identify template components that are appropriate for presenting the content to the user based on the current cognitive state of the user, such as certain fonts of text, cartoon characters, sounds (e.g., audible words or music), etc.

As described in block 610, the processor(s) then alter an initial template that was being used to present the content on the user interface, As described herein, altering the initial template creates an altered template, and the altered template uses the template components that are determined to be appropriate for presenting the content to the user based on the current cognitive state of the user.

As described in block 612, the processor(s) then present the content on the user interface using the altered template.

The flow chart ends at terminator block 614.

In an embodiment of the present invention, the current cognitive state of the user is from a group consisting of nervousness, elation, fatigue, frustration, anger, and distraction.

In an embodiment of the present invention, the processor(s) identify a cohort of users who share the current cognitive state of the user. For example, cohort members may all have a same cognitive deficiency, be temporarily suffering a same level of anxiety, etc. The processor(s) then determine a preferred template that was used in the past to present content to members of the cohort of users, and present the content on the user interface using that preferred template.

In an embodiment of the present invention, the processor(s) determine the current cognitive state of the user based on biometric sensor readings from biometric sensors associated with the user (e.g., biometric sensors 153 shown in FIG. 1).

In an embodiment of the present invention, the processor(s) determine the current cognitive state of the user based on facial expression analysis of the user (e.g., using the camera 123 shown in FIG. 1).

In an embodiment of the present invention, the processor(s) determine the current cognitive state of the user based on a noise level in an environment of the user (e.g., using readings from environmental sensors 155 in FIG. 1).

In an embodiment of the present invention, the processor(s) determine the current cognitive state of the user based on distractions to the user caused by a quantity of open windows on a computer desktop being used by the user. That is, computer 101 can detect how many applications and/or open windows are running on the client compute 155. Based on this information, computer 101 will determine how to format the template used to display content on the client computer 151.

In an embodiment of the present invention, the processor(s) determine the current cognitive state of the user based on a concurrent use of other devices by the user. That is, the computer 101 may determine, based on monitoring of cell phone networks or from photos taken by camera 123 in FIG. 1, that the user of client computer 151 is currently on the phone. Based on this information, the template used to present information to the user will be adjusted accordingly (e.g., using only visual information without any verbal/oral information being presented on the client computer 151).

In an embodiment of the present invention, the processor(s) determine the current cognitive state of the user based on fatigue of the user based on meeting schedules for the user from an electronic calendar. That is, the computer 101 will examine the electronic calendar of the user of the client computer 151. If the user of the client computer 151 has been in meetings all day, then the computer 101 may add soft music to the presentation, reduce the amount of information being presented, etc.

In an embodiment of the present invention, the processor(s) determine the current cognitive state of the user based on a user profile of the user.

In an embodiment of the present invention, altering the initial template to create the altered template includes changing graphics and layouts of the initial template.

In an embodiment of the present invention altering the initial template to create the altered template comprises an addition of visual scenes (e.g., calming ocean waves) that are designed to soothe the user.

In an embodiment of the present invention, altering the initial template to create the altered template includes adding sound (e.g., rippling water, soft music, etc.) that has been predetermined to sooth the user.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
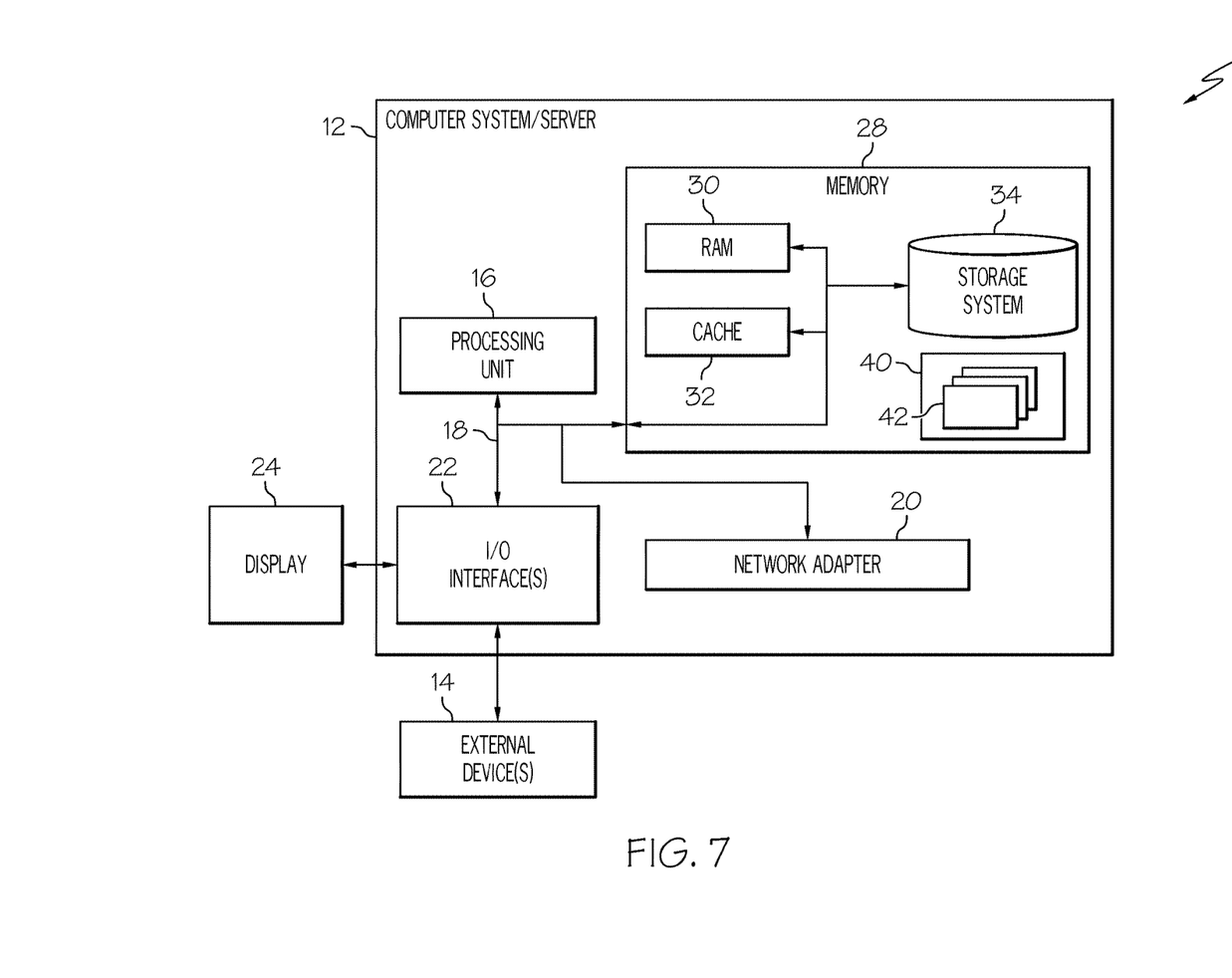
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
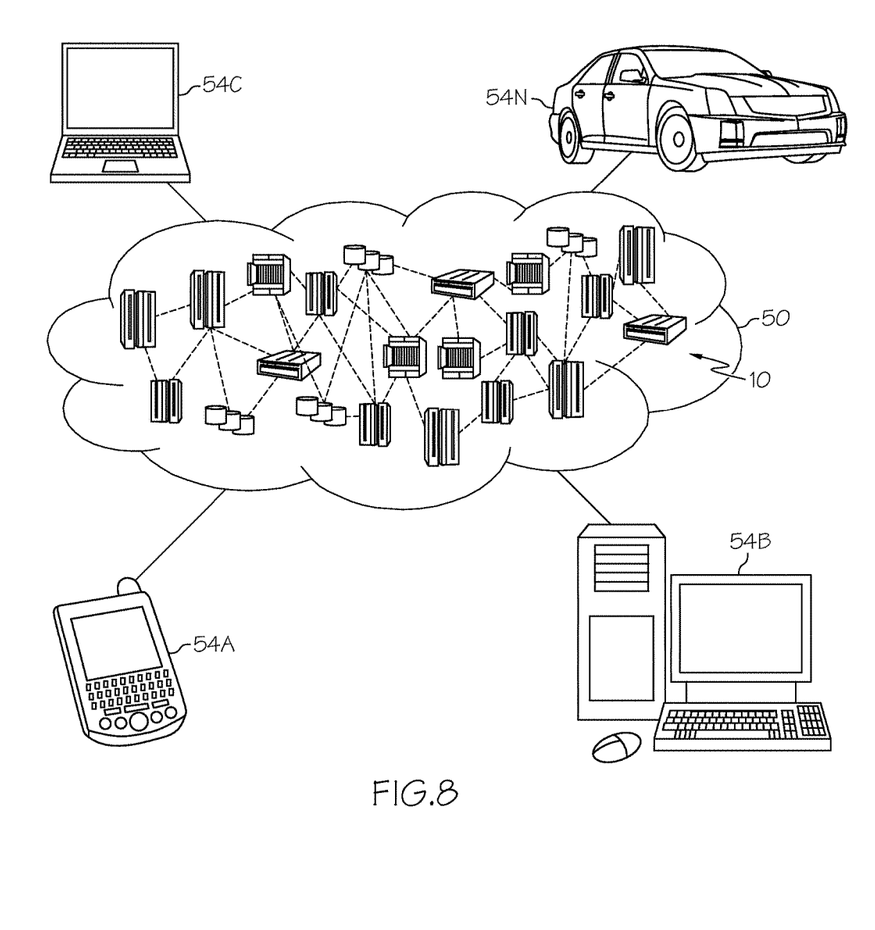
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
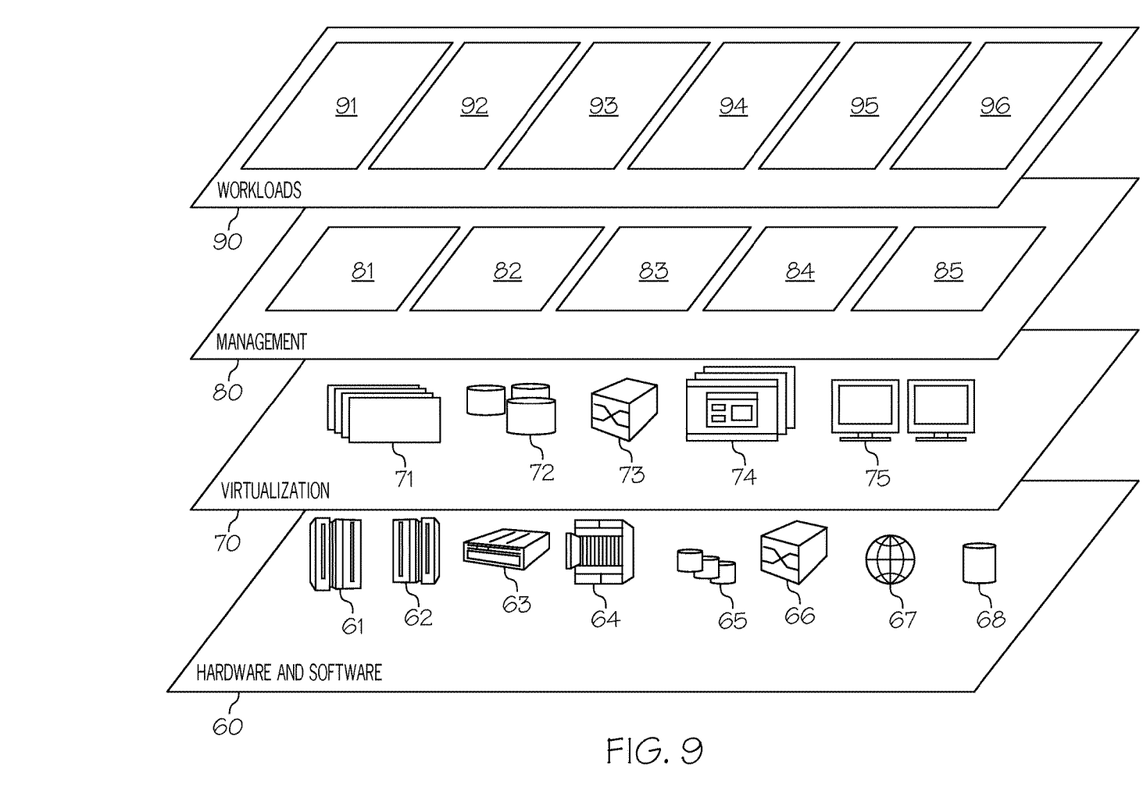
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and template alteration processing 96 (for altering templates used on UIs as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of altering a template used to display content on a user interface, the processor-implemented method comprising:

receiving, by one or more processors, a transmission from one or more hardware devices that describes a current cognitive state of a user;

receiving, by one or more processors, content to be presented to the user on a user interface;

identifying, by one or more processors, template components that are appropriate for presenting the content to the user based on the current cognitive state of the user;

altering, by one or more processors, an initial template used to present the content, wherein the initial template is from a plurality of templates, wherein altering the initial template creates an altered template, wherein the altered template uses the template components that are determined to be appropriate for presenting the content to the user based on the current cognitive state of the user, wherein the altered template is a template composition, wherein the template composition utilizes template snippets that are composed in real time based on a user's real-time context, and wherein the user's real-time context includes a current emotional state of the user, a physical state of the user, and a physical environment of the user;

determining, by one or more processors, that the initial template is best suited for displaying the content based on the user's real-time context; and presenting, by one or more processors, the content on the user interface using the initial template.

2. The processor-implemented method of claim 1, wherein the current cognitive state of the user is from a group consisting of nervousness, elation, fatigue, frustration, anger, and distraction.

3. The processor-implemented method of claim 1, further comprising:

identifying, by one or more processors, a cohort of users who share the current cognitive state of the user;

determining, by one or more processors, a preferred template used to present content to members of the cohort of users; and presenting, by one or more processors, the content on the user interface using the preferred template.

4. The processor-implemented method of claim 1, further comprising:

determining, by one or more processors, the current cognitive state of the user based on biometric sensor readings from biometric sensors associated with the user.

5. The processor-implemented method of claim 1, further comprising:

determining, by one or more processors, the current cognitive state of the user based on a facial expression analysis of the user.

6. The processor-implemented method of claim 1, further comprising:

determining, by one or more processors, the current cognitive state of the user based on a noise level in an environment of the user.

7. The processor-implemented method of claim 1, further comprising:

determining, by one or more processors, the current cognitive state of the user based on distractions to the user caused by a quantity of open windows on a computer desktop being used by the user.

8. The processor-implemented method of claim 1, further comprising:

determining, by one or more processors, the current cognitive state of the user based on a concurrent use of other devices by the user.

9. The processor-implemented method of claim 1, further comprising:

determining, by one or more processors, the current cognitive state of the user based on fatigue of the user, wherein the fatigue of the user is determined based on a meeting schedule for the user derived from an electronic calendar.

10. The processor-implemented method of claim 1, further comprising:

determining, by one or more processors, the current cognitive state of the user based on a user profile of the user.

11. The processor-implemented method of claim 1, wherein altering the initial template to create the altered template comprises changing graphics and layouts of the initial template.

12. The processor-implemented method of claim 1, wherein altering the initial template to create the altered template comprises an addition of visual scenes that are designed to soothe the user.

13. The processor-implemented method of claim 1, wherein altering the initial template to create the altered template comprises adding sound that has been predetermined to soothe the user.

14. The processor-implemented method of claim 1, wherein the content is textual content.

15. The processor-implemented method of claim 1, wherein the content to be presented to the user on the user interface is a questionnaire, wherein the initial template requires that information be presented in a structured format, and wherein the processor-implemented method further comprises:

receiving, by one or more processors, a portion of the information from a user input by the user;

determining, by one or more processors, that the user is in an impaired cognitive state; and in response to determining that the user is in the impaired cognitive state, overriding the initial template and implementing the altered template, wherein the altered template presents natural language questions to the user that ask for answers to the questionnaire that are not answered by the portion of the information received from the user input by the user.

16. The processor-implemented method of claim 1, wherein the user is a driver who is currently driving a vehicle, and wherein the processor-implemented method further comprises:

determining, by one or more processors, that a preferred template of the driver for presenting the content is a text template;

determining, by one or more processors and based on one or more hardware devices that describes the current cognitive state of the user, that the current cognitive state of the driver is fatigue; and in response to determining that the current cognitive state of the driver is fatigue, overriding, by one or more processors, the preferred template of the driver and aurally presenting, by one or more processors, the content using a text-to-speech template that aurally presents the content to the driver while driving the vehicle.

17. A computer program product for altering a template used to display content on a user interface, the computer program product comprising a non-transitory computer readable storage medium having program code embodied therewith, the program code readable and executable by a processor to perform a method comprising:

receiving a transmission from one or more hardware devices that describes a current cognitive state of a user;

receiving content to be presented on to the user a user interface;

identifying template components that are appropriate for presenting the content to the user based on the current cognitive state of the user;

altering an initial template used to present the content, wherein the initial template is from a plurality of templates, wherein altering the initial template creates an altered template, wherein the altered template uses the template components that are determined to be appropriate for presenting the content to the user based on the current cognitive state of the user, wherein the altered template is a template composition, wherein the template composition utilizes template snippets that are composed in real time based on a user's real-time context, and wherein the user's real-time context includes a current emotional state of the user, a physical state of the user, and a physical environment of the user;

determining that the initial template is best suited for displaying the content based on the user's real-time context; and presenting the content on the user interface using the initial template.

18. The computer program product of claim 17, wherein the method further comprises:

identifying a cohort of users who share the current cognitive state of the user;

determining a preferred template used to present content to members of the cohort of users; and presenting the content on the user interface using the preferred template.

19. A computer system comprising:

a processor, a computer readable memory, and a non-transitory computer readable storage medium;

first program instructions to receive a transmission from one or more hardware devices that describes a current cognitive state of a user;

second program instructions to receive content to be presented to the user on a user interface;

third program instructions to identify template components that are appropriate for presenting the content to the user based on the current cognitive state of the user;

fourth program instructions to alter an initial template used to present the content, wherein the initial template is from a plurality of templates, wherein altering the initial template creates an altered template, wherein the altered template uses the template components that are determined to be appropriate for presenting the content to the user based on the current cognitive state of the user, wherein the altered template is a template composition, wherein the template composition utilizes template snippets that are composed in real time based on a user's real-time context, and wherein the user's real-time context includes a current emotional state of the user, a physical state of the user, and a physical environment of the user;

fifth program instructions to determine that the initial template is best suited for displaying the content based on the user's real-time context; and sixth program instructions to present the content on the user interface using the initial template; and wherein the first, second, third, fourth, fifth, and sixth program instructions are stored on the non-transitory computer readable storage medium for execution by one or more processors via the computer readable memory.

* * * * *